United States Patent
Liang et al.

(10) Patent No.: US 9,473,339 B2
(45) Date of Patent: Oct. 18, 2016

(54) PERFORMING UPSTREAM SYMBOL ALIGNMENT UNDER FEXT

(71) Applicant: Futurewei Technologies, Inc., Plano, TX (US)

(72) Inventors: Haixiang Liang, Atherton, CA (US); Yixian Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/249,750

(22) Filed: Apr. 10, 2014

(65) Prior Publication Data

US 2014/0307749 A1    Oct. 16, 2014

Related U.S. Application Data

(60) Provisional application No. 61/811,334, filed on Apr. 12, 2013.

(51) Int. Cl.
| | |
|---|---|
| *H04L 27/26* | (2006.01) |
| *H04B 3/32* | (2006.01) |
| *H04M 3/34* | (2006.01) |
| *H04M 11/06* | (2006.01) |
| *H04L 5/14* | (2006.01) |

(52) U.S. Cl.
CPC ............ *H04L 27/2601* (2013.01); *H04B 3/32* (2013.01); *H04M 3/34* (2013.01); *H04M 11/062* (2013.01); *H04L 5/1469* (2013.01); *H04L 27/2655* (2013.01)

(58) Field of Classification Search
CPC .... H04B 3/32; H04M 3/18; H04L 25/03012; H04L 27/2601; H04L 5/1469
See application file for complete search history.

(56) References Cited

U.S. PATENT DOCUMENTS

| | | | |
|---|---|---|---|
| 5,951,677 | A | 9/1999 | Wolf et al. |
| 2005/0123027 | A1 | 6/2005 | Cioffi et al. |

(Continued)

FOREIGN PATENT DOCUMENTS

| | | |
|---|---|---|
| CN | 101453246 A | 6/2009 |
| CN | 101908909 A | 12/2010 |

OTHER PUBLICATIONS

Oksman, V., et al., "The ITU-T's New G.vector Standard Proliferates 100 Mb/s DSL," IEEE Communications Magazine, Oct. 2010, pp. 140-148.*

(Continued)

*Primary Examiner* — Andrew Chriss
*Assistant Examiner* — Salvador E Rivas
(74) *Attorney, Agent, or Firm* — Conley Rose, P.C.; Grant Rodolph; Adam J. Stegge

(57) ABSTRACT

A method for implementing an upstream symbol alignment within a network component, the method comprising receiving an upstream sync signal via an initializing digital subscriber line (DSL) during a channel discovery phase from a customer premise equipment (CPE), determining a corrected upstream symbol alignment value based upon the upstream sync signal, and transmitting the corrected upstream symbol alignment value to the CPE, wherein the upstream symbol alignment value determines an upstream symbol alignment for one or more upstream transmissions, and wherein the corrected upstream symbol alignment value is determined before receiving a plurality of upstream data signals within the data symbol positions during the channel discovery phase.

3 Claims, 7 Drawing Sheets

(56) References Cited

U.S. PATENT DOCUMENTS

| | | | |
|---|---|---|---|
| 2006/0203896 A1* | 9/2006 | Clausen | H04L 5/143 375/219 |
| 2008/0013611 A1 | 1/2008 | Stolle | |
| 2008/0069248 A1 | 3/2008 | Heise et al. | |
| 2008/0260011 A1* | 10/2008 | Peeters | H04L 1/0025 375/222 |
| 2009/0270038 A1* | 10/2009 | Clausen | H04M 11/062 455/63.1 |
| 2010/0329399 A1* | 12/2010 | De Lind Van Wijngaarden | H04B 3/32 375/346 |
| 2012/0075984 A1 | 3/2012 | Cendrillon et al. | |
| 2013/0064065 A1* | 3/2013 | Powell | H04B 3/20 370/201 |
| 2013/0215951 A1* | 8/2013 | Nuzman | H04B 3/32 375/227 |

OTHER PUBLICATIONS

ITU-T document, "G.993.5: Self-FEXT cancellation (vectoring) for use with VDSL2 transceivers", Apr. 2010, 80 pages.*

"Updated draft text for G.fast -version 4.0", ITU—Telecommunication Standardization Sector, Temporary Document 2013-03-Q4-R20, Study Group 15, Question: 4/15, Red Bank, New Jersey, Mar. 18-22, 2013, 68 pages.

"Draft Recommendation ITU-T G.9701 (for AAP, Jan. 2014)", ITU—Telecommunication Standardization Sector, TD 159 Rev.2 (PLEN/15), Study Group 15, Study Period 2013-2016, Mar. 24-Apr. 2, 2014, 285 pages.

"Series G: Transmission Systems and Media, Digital Systems and Networks—Digital sections and digital line system—Access networks—Very high speed digital subscriber line transceivers 2 (VDSL2)", ITU-T—Telecommunication Standardization Sector of ITU, ITU-T Recommendation G.993.2, 333 pages.

"Series G: Transmission Systems and Media, Digital Systems and Networks—Digital sections and digital line system—Access networks—Very high speed digital subscriber line transceivers 2 (VDSL2)", ITU-T—Telecommunication Standardization Sector of ITU, ITU-T Recommendation G.993.2, Feb. 2006, 252 pages.

"Series G: Transmission Systems and Media, Digital Systems and Networks—Digital sections and digital line system—Access networks—Self-FEXT cancellation (vectoring) for use with VDSL2 transceivers", ITU-T Standardization Sector of ITU, ITU-T Recommendation G.993.5, Apr. 2010, 80 pages.

"Series G: Transmission Systems and Media, Digital Systems and Networks—Digital sections and digital line system—Access Networks—Handshake procedures for digital subscriber line transceivers", ITU-T - Telecommunication Standardization Sector of ITU, ITU-T Recommendation G.994.1, Jun. 2012, 900 pages.

Foreign Communication From A Counterpart Application, PCT Application No. PCT/CN2014/075233, International Search Report dated Jul. 22, 2014, 7 pages.

Foreign Communication From A Counterpart Application, PCT Application No. PCT/CN2014/075233, Written Opinion dated Jul. 22, 2014, 4 pages.

Foreign Communication From A Counterpart Application, European Application No. 14783352.9, Extended European Search Report dated Feb. 1, 2016, 10 pages.

Foreign Communication from a Counterpart Application, Chinese Application No. 201480010347.2, Chinese Office Action dated Jul. 4, 2016, 3 pages.

Foreign Communication from a Counterpart Application, Chinese Application No. 201480010347.2, Chinese Search Report dated Jul. 19, 2016, 2 pages.

* cited by examiner

| FIELD | FIELD NAME | FORMAT |
|---|---|---|
| 1 | MESSAGE DESCRIPTOR | MESSAGE CODE |
| 2 | TIME GAP CORRECTION ($\Delta T_{g1}$') | 2 BYTES |

PERFORMING UPSTREAM SYMBOL ALIGNMENT UNDER FEXT

CROSS-REFERENCE TO RELATED APPLICATIONS

The present application claims priority to U.S. Provisional Patent Application No. 61/811,334 filed Apr. 12, 2013 by Haixiang Liang et al. and entitled "Upstream Symbol Alignment Procedure Under Strong FEXT," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies provide a large bandwidth for digital communications over existing subscriber lines (e.g., copper pairs). To transmit data signals, many current DSL systems, including asymmetric DSL 2 (ADSL2), ADSL2+, very high speed DSL (VDSL), and very high speed DSL 2 (VDSL2), and other DSL systems, including Fast Access to Subscriber Terminals (G.fast), a consented standard, may employ discrete multi-tone (DMT) modulation. Systems that perform duplex transmission using frequency division duplex (FDD), such as ADSL2 and VDSL2, separate downstream signals from the upstream signals by exchanging the signals using different frequency bands. Alternatively, systems that perform duplex transmission using time-division duplex (TDD) may use separate time intervals for upstream and downstream transmission. During upstream transmission from a remote side modem, for example, there may be no downstream transmission in a G.fast DSL system from a corresponding modem at a central office (CO), a fiber to the curbside cabinet (FTTC), or distribution point unit (DPU).

When transmitting data over the subscriber lines, crosstalk interference can occur between the transmitted signals over adjacent lines, for example in a same or nearby bundle of lines. Crosstalk, including near-end crosstalk (NEXT) and far-end crosstalk (FEXT), may limit the performance of various DSL systems, such as those defined by standards including ADSL2, VDSL, VDSL2, and G.fast. Typically, FEXT levels increase and become more problematic as the high frequency band edge increases for DSL systems. For example, a VDLS2 system may operate at bandwidth frequencies ranging from about 17 to 30 megahertz (MHz), while a G.fast DSL system may operate at bandwidth frequencies ranging from about 100 MHz and higher. As such, the FEXT levels within a G.fast DSL system may be relatively higher (e.g. FEXT levels may be as strong as the data signal) than a VDSL2 system.

Vectoring techniques may be used to cancel FEXT amongst subscriber lines within a vectored group in the downstream and upstream directions for DSL systems (e.g. VDSL2 and G.fast). Vectoring cancels crosstalk by coordinating and managing a group of subscriber line signals in order to reduce crosstalk levels. Vectoring is described in more detail in the International Telecommunication Union Telecommunication Standardization Sector (ITU-T) G.993.5, entitled "Self-FEXT cancellation (vectoring) for use with VDSL2 transceivers," updated April 2010, which is hereby incorporated by reference as if reproduced in its entirety. In vectored DSL systems, in order to implement downstream and upstream vectoring, the vectored DSL systems may implement symbol alignment. Specifically, downstream symbols transmitted by transceivers at the operator end (TU-Os) of a vectored group may be aligned between themselves at an operator side interface (U-O referenced point) and upstream symbols transmitted by transceivers at the customer end (TU-Rs) of a vectored group may be aligned between themselves at the U-O reference point. Symbol alignment in the downstream direction may be achieved by transmitting DMT symbols at the same time on all of the subscriber lines in the vectored group because the TU-Os are typically co-located, clock synchronized, and more likely within the same DSL access multiplexer (DSLAM) equipment. Unfortunately, in comparison to the downstream direction, symbol alignment in the upstream direction may be relatively more difficult because the TU-Rs are generally situated at different locations.

SUMMARY

In one embodiment, the disclosure includes an apparatus comprising a first transceiver unit (TU) for coupling to a first initializing DSL, a memory, and a processor coupled to the memory and the first TU, wherein the memory includes instructions that when executed by the processor cause the apparatus to perform the following: receive an upstream sync signal via the first TU, determine a correction value that corresponds to an upstream symbol alignment for the first initializing DSL using the upstream sync signal, and transmit the correction value in a downstream direction via the first TU, wherein the correction value is determined prior to receiving a plurality of upstream signals located in a plurality of data symbol positions.

In another embodiment, the disclosure includes a method for implementing an upstream symbol alignment within a network component, the method comprising receiving an upstream sync signal via an initializing DSL during a channel discovery phase from a customer premise equipment (CPE), determining a corrected upstream symbol alignment value based upon the upstream sync signal, and transmitting the corrected upstream symbol alignment value to the CPE, wherein the upstream symbol alignment value determines an upstream symbol alignment for one or more upstream transmissions, and wherein the corrected upstream symbol alignment value is determined before receiving a plurality of upstream data signals within the data symbol positions during the channel discovery phase.

In yet another embodiment, the disclosure includes an apparatus comprising a TU for coupling to an initializing DSL, a memory, and a processor coupled to the memory and the first TU, wherein the memory includes instructions that when executed by the processor cause the apparatus to perform the following: transmit via the TU an upstream sync signal that comprises an upstream sync symbol and a plurality of quiet symbols located within the data symbol positions, receive via the TU a corrected upstream symbol alignment value; and adjust an upstream symbol alignment for an upstream transmission via the initializing DSL based on the corrected upstream symbol alignment value, wherein the corrected upstream symbol alignment value is received before transmitting upstream data signals within the data symbol positions.

In yet another embodiment, the disclosure includes a method for implementing an upstream symbol alignment within a network component, the method comprising transmitting an upstream sync signal over an initializing DSL during a channel discovery phase to an operator side node, receiving a corrected upstream symbol alignment value from the operator side node, and transmitting a plurality of upstream signals over the initializing DSL that are aligned based on the corrected upstream symbol alignment value to the operator side node, wherein the corrected upstream symbol alignment value corresponds to a time gap between receiving and transmitting symbols by the network component, and wherein the corrected upstream symbol alignment value is determined before transmitting a plurality of upstream data signals within the data symbol positions during the channel discovery phase.

In yet another embodiment, the disclosure includes a network system comprising a TU-O, and a TU-R coupled to the TU-O via an initializing DSL, wherein the TU-O is configured to receive an upstream sync signal over the initializing DSL, estimate a correction value that corresponds to an upstream symbol alignment for the initializing DSL using the upstream sync signal, and transmit the correction value to the TU-R over the initializing DSL, wherein the TU-R is configured to transmit the upstream sync signal that comprises an upstream sync symbol over the initializing DSL, receive the correction value over the initializing DSL, adjust an upstream symbol alignment for an upstream transmission over the initializing DSL based on the correction value, and transmit one or more upstream signals over the initializing DSL using the adjusted upstream symbol alignment, wherein the correction value is determined prior to receiving the upstream signals that are located in a plurality of data symbol positions at the TU-O.

In yet another embodiment, the disclosure includes a network system comprising a G.fast transceiver unit at an operator side (FTU-O), wherein the FTU-O is configured to perform the following during a CHANNEL DISCOVERY 1 stage for an initializing DSL: send to a G.fast transceiver unit at remote side (FTU-R) an initial value of a time gap To, within an O-SIGNATURE message, receive an R-P-VECTOR 1 signal, estimate a correction of the initial value of the time gap $T_{g1'}$, and transmit the correction of the initial value of the time gap $T_{g1'}$ to the FTU-R using an O-TG-UPDATE message, wherein the time gap $T_{g1'}$ is an upstream time gap located between an end of receiving a downstream transmission and a start of transmitting an upstream transmission by the FTU-R.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
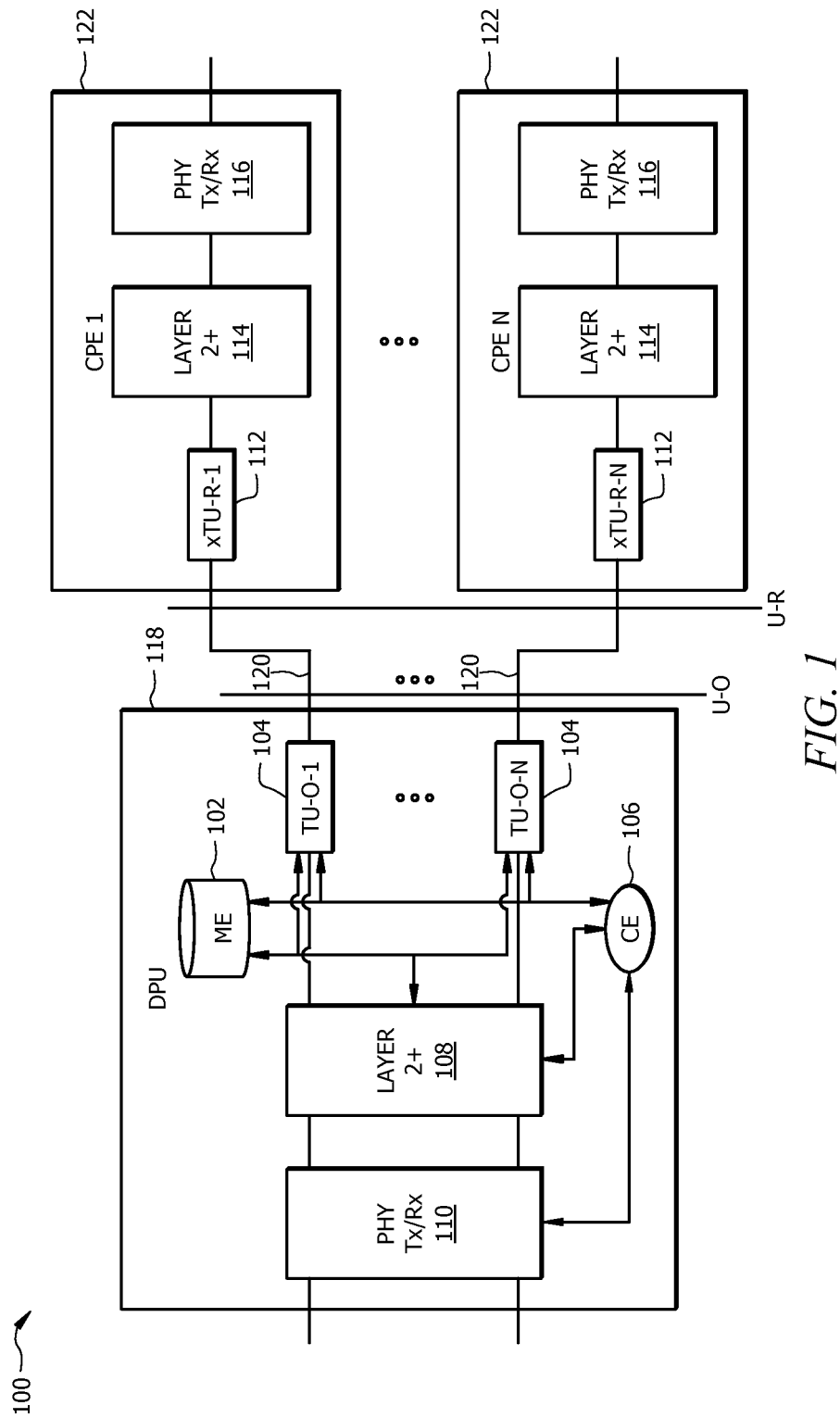
FIG. 1 is a schematic diagram of an embodiment of an xDSL system where embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Depending on the supported standard, a DSL system may be denoted as an xDSL system, where 'x' may indicate any DSL standard. For instance, 'x' stands for 'A' in ADSL2 or ADSL2+ systems, 'V' in VDSL or VDSL2 systems, and 'F' in G.fast systems. When a transceiver unit is located at an operator end of the DSL system, including a CO, a DSLAM, cabinet, or a DPU, the transceiver unit may be referred to as an xTU-O. On the other hand, when a transceiver unit is located at a remote or user end such as a CPE, the transceiver unit may be referred to as an xTU-R. For example, if the DSL system is a G.fast system, a transceiver unit at an operator side may be referred to as a G.fast transceiver unit at an operator side, FTU-O. Similarly, in the G.fast system, a CPE transceiver may be referred to as a G.fast transceiver unit at remote side, FTU-R, which may also be referenced as a subscriber side.

Disclosed herein are at least one method, apparatus, and system that achieve accurate upstream symbol alignment during the early stage of initializing a subscriber line. A control entity (CE) that comprises a vector CE (VCE) may control the alignment of symbols for one or more subscriber lines of a vectored group at a U-O reference point (e.g. U-O2 reference point) and a U-R reference point (e.g. U-R2 reference point). Specifically, a CE may adjust or correct a time gap prior to using upstream data symbol positions for training. Initially, during the early stage of the Channel Discovery Phase, the CE may estimate an initial value of a time gap between receiving (e.g. downstream transmission) and transmitting (e.g. upstream transmission) symbols by an xTU-R. The initial value of a time gap may be used to align transmission by an xTU-R (e.g. upstream transmission) for a joining line with active lines. The CE may subsequently adjust or correct the time gap for a subscriber line during the early stage of the Channel Discovery Phase. The xTU-O may communicate the corrected time gap to the xTU-R in order for the xTU-R to adjust the upstream symbol alignment based on the corrected time gap before transmitting upstream data signals within the data symbol positions.

Throughout the disclosure, the term "initializing line" references a subscriber line that is in a state of performing the initialization procedure, while an "active line" references a subscriber line already in the showtime state. An "active line" may also be interchangeably referred to as a "vectored line" to signify that a subscriber line is in a showtime state and belongs to a vectored group. The terms "time gap" and "time gap correction" may also be interchangeable throughout the disclosure with the terms "timing advance" and "timing advance correction," respectively, such that "time gap" and "time gap correction" may be used for TDD based DSL systems and "timing advance" and "timing advance correction," may be used for FDD based DSL systems. Additionally, for this disclosure, the term "data symbol positions" during the initialization procedure refer to symbol positions other than the sync symbol position within a TDD or FDD frame.

FIG. 1 is a schematic diagram of embodiment of an xDSL system 100 where embodiments of the present disclosure may operate. The xDSL system 100 may be an ADSL2, ADSL2+, VDSL, VDSL2, and/or a G.fast DSL system. The xDSL system 100 may be configured to perform DMT, Orthogonal Frequency-Division Multiple Access (OFDMA), and/or other digital modulation methods. In one embodiment, the xDSL system 100 may be configured to perform duplex transmission using TDD (e.g. G.fast DSL system). In another embodiment, the xDSL system 100 may be configured to perform duplex transmission using FDD (e.g. VDSL2 system). For convenience purposes, throughout this disclosure, data signals that are transmitted from the xTU-Os 1-N 104 to the xTU-Rs 1-N 112 will be referenced as a downstream transmission, and data received by the xTU-Os 1-N 104 and transmitted from the xTU-Rs 1-N 112 will be referenced as an upstream transmission.

The xDSL system 100 may comprise a DPU 118 and a plurality of CPEs 1-N 122. The DPU 118 may be coupled to the CPEs 1-N 122 via a plurality of subscriber lines 120. The subscriber lines 120 may form transmissions paths between the DPU 118 and the CPEs 1-N 122. The subscriber lines 120 may be made of any suitable material, such as copper wire. FIG. 1 also illustrates a U-O reference point and a U-R reference point. The U-O reference point may reference the operator side of the subscriber lines 120 (e.g. wire pair) and the U-R reference point may reference the remote side of the subscriber lines 120. In one embodiment, the U-O2 and U-R2 reference points may be located at the same location as the U-O and U-R reference point. For example, high pass filters that are typically found within splitters may be integrated within the xTU-O 104 and xTU-R 112 such that the U-O2 and U-R2 reference points reference the same locations as the U-O and U-R reference point, respectively.

The DPU 118 may comprise a physical (PHY) transmitting (Tx)/receiving (Rx) interface 110, a layer 2+ module 108, a CE 106, a management entity (ME) 102, and one or more xTU-Os 1-N 104. Each of the CPEs 1-N 122 may comprise an xTU-R 112, a layer 2+ module 114, and a PHY Tx/Rx interface 116. Each of the PHY Tx/Rx interfaces 110 and 116 may comprise a plurality of ports and a plurality of transceivers that transmit and/or receive data signals in the electrical domain and/or in the optical domain. The layer 2+ modules 108 and 114 may be components configured to process incoming data abstracted at Open Systems Interconnection (OSI) layer 2 or higher. The ME 102 may be one or more network components and/or devices that provide network support information for resource utilization and map the components within the DPU 118. For instance, ME 102 may be configured to convey management information to each of the xTU-Os 1-N 104.

The CE 106 may be one or more network components and/or devices that perform control functions and convey the operational status of the DPU 118, such as identifying which subscriber line 120 to route data signals to and obtaining the current traffic load for each subscriber line 120. In one embodiment, the CE 106 may comprise a Timing Control Entity (TCE), a VCE, and/or a Dynamic Resource Allocation (DRA) that includes the Power Control Entity (PCE). The TCE may be configured to coordinate the transmission and reception with synchronous time-division duplex (STDD) over a vectored group. The VCE may be configured to coordinate the crosstalk cancellation over the vectored group. The DRA may be configured to coordinate the downstream and upstream transmission opportunities over the vectored group. For example, the DRA may comprise the PCE that may track the power consumption for users and may limit the allocation of transmission opportunities per subscriber line, in both upstream and downstream directions. The TCE, VCE, DRA, and PCE are discussed in more detail in ITU-T, Study Group 15, Temporary Document 159 Rev. 2 (PLEN/15), and entitled "Draft Recommendation ITU-T G.9701 (for AAP, 16 Jan. 2014)," January 2014, which is hereby incorporated by reference as if reproduced in its entirety. In another embodiment, the CE 106 may comprise a VCE and may not comprise the TCE when implementing FDD. The VCE may be configured to coordinate the crosstalk cancellation over the vectored group as described in ITU-T G.993.5.

Figure 2:
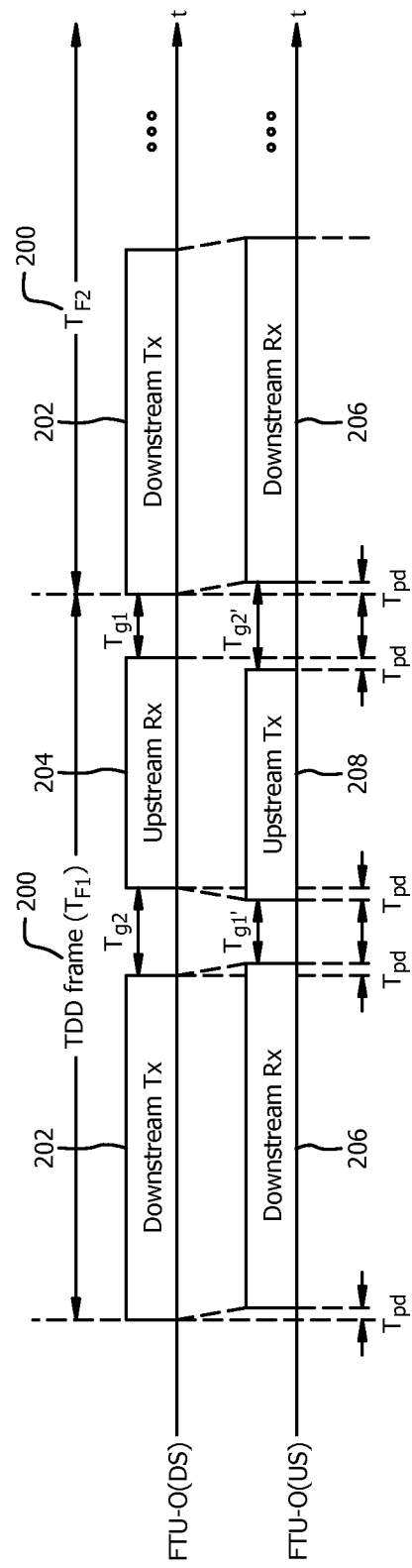
FIG. 2 is a schematic diagram of an embodiment of a TDD frame used during both initialization and showtime state for a subscriber line.

FIG. 2 is a schematic diagram of an embodiment of a TDD frame 200 used during both initialization and showtime state for a subscriber line. For the downstream direction, FIG. 2 illustrates that the TDD frame $T_{F1}$ 200 may start with the FTU-O transmitting the downstream Tx symbols 202 to the FTU-R. Afterwards, FTU-O may receive the upstream Rx symbols 204 portion of the TDD frame $T_{F1}$ 200 after a propagation delay of $T_{pd}$ of transmitting the upstream Tx symbols 208 by the FTU-R. A time gap $T_{g2}$ exists in between the end of the downstream Tx symbols 202 and the start of the upstream Rx symbols 204 within TDD frame $T_{F1}$ 200. Another time gap $T_{g1}$ exists between the end of the upstream Rx symbols 204 and the start of another downstream Tx symbols 202 located within the next TDD frame $T_{F2}$ 200. The values of time gap $T_{g1}$ and time gap $T_{g2}$ reference gaps of times at a U-O reference point (e.g. U-O interface) of the FTU-O.

For the upstream direction, FIG. 2 illustrates that for the TDD frame $T_{F1}$ 200, the FTU-R starts to receive the downstream Rx symbols 206 after a propagation delay of $T_{pd}$ of the FTU-O transmitting the downstream Tx symbols 202. The downstream Rx symbols 206 correspond to the downstream Tx symbols 202 for the TDD frame $T_{F1}$ 200. The receiving of downstream Rx symbols 206 is followed by the FTU-R transmitting the upstream Tx symbols 208 for the TDD frame $T_{F1}$ 200 to the FTU-O. A time gap $T_{g1'}$ may exist between the end of the downstream Rx symbols 206 and the start of the upstream Tx symbols 208. Another time gap $T_{g2'}$ may exist between the end of the upstream Tx symbols 208 and the start of another downstream Rx symbols 206 for the next TDD frame $T_{F2}$ 200. The values of time gap $T_{g1'}$ and $T_{g2'}$ may reference the gap times at the U-R reference point of the FTU-R.

In G.fast DSL systems, because of the high frequency subcarriers, substantial crosstalk may exist between subscriber lines, specifically FEXT. Without adjusting or correcting the initial value of time gap $T_{g1'}$, the upstream symbol alignment may be a rough estimate at the start of transmitting signals within the data symbol positions of a TDD frame. In this scenario, the transmission of data symbols without accurate upstream symbol alignment (e.g. a rough upstream symbol alignment) may affect the data transmission of active lines because of crosstalk. Furthermore, without updating the upstream symbol alignment at the early stages of the Channel Discovery Phase, alignment refinement and updating upstream vectoring coefficients based on the alignment refinement may need to be subsequently calculated again. Calculating and updating the value of time gap $T_{g1'}$ for upstream symbol alignment prior to transmitting signals within the data symbol positions of a TDD frame will be discussed in more detail below.

Figure 3:
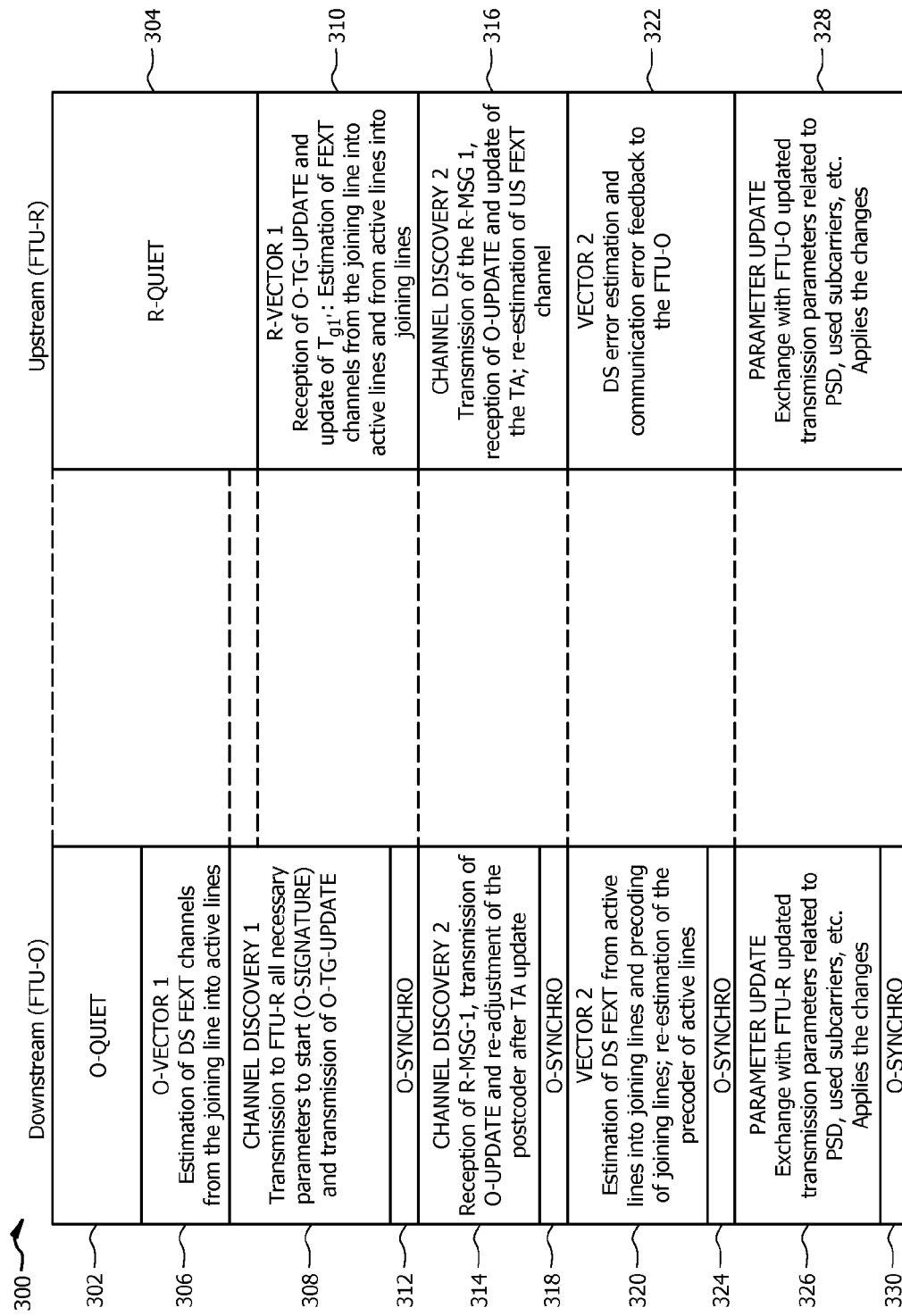
FIG. 3 is a time line diagram of an embodiment of a Channel Discovery Phase within an initialization procedure for a G.fast DSL system.

FIG. 3 is a time line diagram of an embodiment of a Channel Discovery Phase 300 within an initialization procedure for a G.fast DSL system. Prior to the Channel Discovery Phase 300, the initialization procedure for initializing lines may implement the G.994.1 Handshake Phase between the FTU-O and the FTU-R. The FTU-R may initially send a request for joining using G.994.1 handshake signals. During the G.994.1 Handshake Phase, the FTU-O and the FTU-R may exchange capabilities list, such as vectoring capabilities, and agree on a common mode for training and operation. Further details of the G.994.1 Handshake Phase are discussed in more detail in ITU-T, G.994.1, entitled "Handshake Procedures for Digital Subscriber Line Transceivers," June 2012, which is hereby incorporated by reference as if reproduced in its entirety. After a successful completion of the G.994.1 Handshake Phase, the initialization procedure may progress to the Channel Discovery Phase 300 and subsequently to the Channel Analysis and Exchange Phase. The Channel Analysis and Exchange Phase are discussed in more detail in ITU-T Temporary Document 159 Rev. 2 (PLEN/15).

FIG. 3 divides the Channel Discovery Phase 300 into a plurality of stages that correspond to both the downstream direction and the upstream direction. The downstream direction corresponds to downstream transmission by the FTU-O, while the upstream direction refers to upstream transmission by the FTU-R. For initializing lines that complete the G.994.1 Handshake Phase, the FTU-O and the FTU-R may enter the O-QUIET stage 302 and R-QUIET stage 304, respectively. While in the O-QUIET stage 302, the FTU-O may monitor the status of the initializing lines to determine whether the initializing lines become a member of the joining group (e.g. joining lines) or the waiting group. If the FTU-O determines that an initializing line is in the joining group, then the initializing line continues to the O-VECTOR 1 stage 306. At the O-VECTOR 1 stage 306, the active lines may estimate downstream crosstalk (e.g. FEXT) channels from the joining lines into active lines.

After the completion of the O-VECTOR 1 stage 306, the FTU-O enters the CHANNEL DISCOVERY 1 stage 308. During the CHANNEL DISCOVERY 1 stage 308, the FTU-O transmits O-SIGNATURE messages and O-TG-UPDATE messages for upstream symbol alignment. To perform upstream symbol alignment, the FTU-R enters the R-VECTOR 1 stage 310 after receiving the O-SIGNATURE message from the FTU-O. During the R-VECTOR 1 stage 310, the FTU-R may transmit upstream sync symbols based on the time gap values received in the O-SIGNATURE and O-TG-UPDATE message. The FTU-R may not transmit upstream signals located within the data symbol positions of a TDD frame during R-VECTOR 1 stage 310. The O-SIGNATURE message may provide the initial time gap values, and the O-TG-UPDATE message may provide the adjusted or corrected time gap values. After aligning upstream symbol transmission using the O-TG-UPDATE, the active lines may estimate upstream crosstalk channels from the joining lines and the joining lines may estimate the direct channel and crosstalk channels from both the active lines and other joining lines.

In the O-SYNCHRO stage 312, the FTU-O may send an O-P-SYNCHRO signal to indicate the end of the CHANNEL DISCOVERY 1 stage 308. The R-VECTOR 1 stage 310 may end after the FTU-R receives the O-P-SYNCHRO signal. Similar to O-SYNCHRO stage 312, O-P-SYNCHRO signal may be transmitted by the FTU-O within O-SYNCHRO stages 318, 324, and 330 to indicate the end of the CHANNEL DISCOVERY 2 stage 314, VECTOR 2 stage 320, and PARAMETER UPDATE stage 326, respectively. The FTU-R may end stages CHANNEL DISCOVERY 2 stage 316, VECTOR 2 stage 322, and PARAMETER UPDATE 328 after receiving the O-P-SYNCHRO signal within O-SYNCHRO stages 318, 324, and 330, respectively.

The FTU-O and the FTU-R may then transition to the CHANNEL DISCOVERY 2 stage 314 and the CHANNEL DISCOVERY 2 stage 316, respectively. In the CHANNEL DISCOVERY 2 stage 316, the FTU-R may start to transmit upstream signals located within the data symbol positions of a TDD frame. For example, the FTU-R may transmit a remote-message 1 (R-MSG 1) to the FTU-O. The FTU-O, while in CHANNEL DISCOVERY 2 stage 314, may transmit an O-UPDATE message that acknowledges reception of the R-MSG 1. The O-UPDATE message may also comprise an updated time gap value. The FTU-R may receive the O-UPDATE message and use the updated time gap value to further align the upstream symbol transmission.

The remaining stages for the Channel Discovery Phase 300, which include VECTOR 2 stage 320, VECTOR 2 stage 322, PARAMETER UPDATE stage 326, and PARAMETER UPDATE stage 328 are discussed in more detail in ITU-T Temporary Document 159 Rev. 2 (PLEN/15). In VECTOR 2 stage 320, the CE (e.g. VCE) may perform downstream channel estimation of crosstalk from the active lines into the joining lines and between the joining lines. The VCE may also compute and update a variety of parameters, such as precoder coefficients and power spectral density (PSD). The VTU-R within the VECTOR 2 stage 322 may transmit an error feedback message and perform downstream error estimation in order to update parameters and to perform the downstream channel estimation. During the PARAMETER UPDATE stage 326 and the PARAMETER UPDATE stage 328, the FTU-O may exchange with the FTU-R updated transmission parameters, such as PSD and subcarriers. The CE (e.g. VCE) may compute gains for both active lines and join lines to perform downstream spectrum optimization. At the end of the PARAMETER UPDATE stage 326 and the PARAMETER UPDATE stage 328, the PSD and transmission parameters are updated and installed for the FTU-O and the FTU-R.

Figure 4:
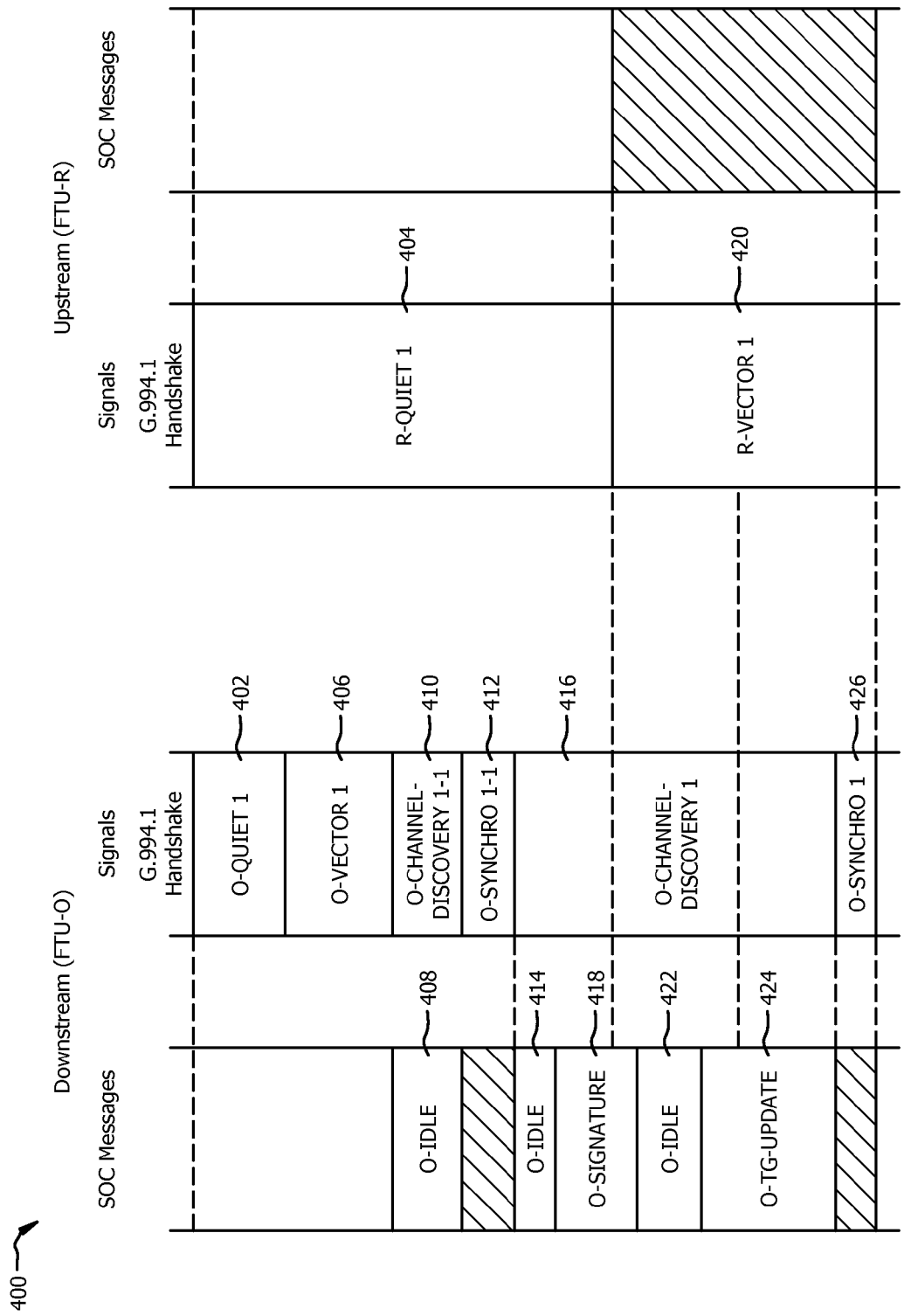
FIG. 4 is a time line diagram of an embodiment of an early stage of the Channel Discovery Phase for a G.fast DSL system.

FIG. 4 is a time line diagram of an embodiment of an early stage of the Channel Discovery Phase 400 for a G.fast DSL system. In the early stage of the Channel Discovery Phase 400, the FTU-O and the FTU-R may exchange both G.994.1 handshake signals and special operations channel (SOC) messages. The SOC channel may be established between the FTU-O and the FTU-R during initialization. During at least some of the CHANNEL DISCOVERY 1 stage 308 in FIG. 3, the SOC channel may be in active state such that the FTU-O may transmit SOC messages that are separated by one or more high-level data link control (HDLC) flags to the FTU-R. The message format of an SOC message is described in the ITU-T Temporary Document 159 Rev. 2 (PLEN/15).

The early stage of the Channel Discovery Phase 400 may start with the FTU-O entering the O-QUIET 1 stage 402 and the FTU-R entering the R-QUIET 1 stage 404. During the O-QUIET 1 stage 402, the FTU-O may not transmit any data signals, and the FTU-R may not transmit any data signals during the R-QUIET 1 stage 404. For example, the FTU-O may produce an O-P-QUIET 1 signal during the O-QUIET 1 stage 402 that provides about a zero output voltage at the U-O reference point. Also, the FTU-R may produce an R-P-QUIET 1 signal during the R-QUIET 1 stage 404 that provides about a zero output voltage at the U-R reference point.

The FTU-O may subsequently enter the O-VECTOR 1 stage 406 when transmitting the O-P-VECTOR 1 signal over a joining line. The O-P-VECTOR 1 signal may comprise downstream sync symbols with non-zero power over the joining line. In one embodiment, the O-P-VECTOR 1 signal may also comprise quiet symbols that are transported at all of the downstream data symbol positions. Within the O-VECTOR 1 stage 406, the active lines may estimate downstream crosstalk channels from the joining lines into active lines. Specifically, the CE (e.g. VCE) may compute downstream precoder coefficients for active lines to cancel crosstalk from the joining lines. The FTU-O may be configured to determine the duration of the O-VECTOR 1 stage 406. The FTU-R maintains the R-QUIET 1 stage 404 and does not transmit any data signals to the FTU-O (e.g. upstream transmission) while the FTU-O is within the O-VECTOR 1 stage 406.

After the O-VECTOR 1 stage 406, the FTU-O moves to the O-Channel Discovery 1-1 stage 410. During the O-Channel Discovery 1-1 stage 410, the FTU-O may continue to transmit sync symbols modulated by probe sequences using an O-P-Channel Discovery 1-1 signal. Within the O-Channel Discovery 1-1 stage 410, the SOC channel may be in an active state to transmit the O-IDLE messages 408. SOC messages, such as O-IDLE message 408, may be transmitted over the first M downstream data symbol positions, where M represents an integer. For example, an SOC signal may be transmitted starting from downstream data symbol position with index 0 to index 2 (e.g. M=3) of each TDD frame. Additionally, the FTU-R, which is in the R-QUIET 1 stage 404, may acquire loop timing, including clock recovery, and symbol and TDD frame boundary alignment. The O-IDLE message 408 may be received by the FTU-R and used to facilitate conditions for timing recovery. The FTU-O may transition to the O-SYNCHRO 1-1 stage 412 to transmit an O-P-SYNCHRO signal to the FTU-R to indicate the end of the O-Channel Discovery 1-1 stage 410.

The FTU-O may subsequently enter the O-Channel Discovery 1 stage 416 after completing the O-SYNCHRO 1-1 stage 412. During the O-Channel Discovery 1 stage 416, the FTU-O continues to transmit the sync symbols modulated by probe sequence and also transmit SOC signals over the first M downstream data symbols of each TDD frame. In one example embodiment, the SOC channel may transmit the O-IDLE messages 414 during eight superframes, followed by the transmission of the O-SIGNATURE messages 418.

The O-SIGNATURE message 418 may comprise a set of parameters used for operation of the FTU-R, such as modulation parameters, probe sequences, and initial PSD mask. In one embodiment, the O-SIGNATURE message 418 may comprise an initial value of a time gap $T_{g1'}$. Time gap $T_{g1'}$ may represent a time gap applied between the downstream and the upstream transmissions. In other words, the time gap $T_{g1'}$ may represent the timing offset between receiving and transmitting symbols by an FTU-R. The time gap $T_{g1'}$ may be used to align upstream transmission of a joining line with active lines. The initial value of time gap $T_{g1'}$ may be calculated during the O-Channel Discovery 1 stage 416 based on a function of loop length. For example, the initial value of time gap $T_{g1'}$ may correspond to a maximum expected loop length for a particular DPU. The initial value of time gap $T_{g1'}$ may be represented as a 16-bit unsigned integer within a field in the O-SIGNATURE message 418. In another embodiment, the initial timing advance value may be implied by other information within the O-SIGNATURE message 418. The time gap $T_{g1'}$ may be updated by the FTU-O during later stages of initialization.

During the overlap of the R-QUIET 1 stage 404 and the O-Channel Discovery 1 stage 416, the FTU-R may synchronize its clock with the FTU-O to achieve symbol timing and synchronization of the TDD frame. The FTU-R may maintain transmission silence (e.g. maintain about a zero output voltage) within the R-QUIET 1 stage 404 until successfully decoding the O-SIGNATURE message 418. After decoding the O-SIGNATURE message 418, the FTU-R may synchronize the upstream and downstream probe sequences and apply parameter settings, such as the initial value of time gap $T_{g1'}$ obtained from O-SIGNATURE message 418. The FTU-R may then transition to the R-VECTOR 1 stage 420 after decoding the O-SIGNATURE message 418.

Within the R-VECTOR 1 stage 420, the FTU-R transmits R-P-VECTOR 1 signals that comprise upstream sync symbols modulated by a probe sequence. In other words, during the R-VECTOR 1 stage 420, the FTU-R does not transmit data signals located within the data symbol positions of a TDD frame. In one embodiment, the FTU-R may transmit only upstream sync symbols within the R-P-VECTOR 1 signals. As shown in FIG. 4, the FTU-R does not transmit SOC messages via the SOC channels. In one embodiment, the FTU-R may transmit quiet symbols at each of the upstream data symbol positions for R-P-VECTOR 1 signals. The FTU-R's contents of the probe sequence, the time positions, and other transmission parameters within the R-VECTOR 1 stage 420 may correspond to the information received in the O-SIGNATURE message 418. For instance, when transmitting the upstream sync symbols, the FTU-R may initially align the upstream symbols using the initial values of time gap $T_{g1'}$.

After the FTU-O detects the R-P-VECTOR 1 signal, the FTU-O may stop transmitting the O-SIGNATURE messages 418 and start transmitting O-IDLE messages 422. During the transmission of the O-IDLE messages 422, the FTU-O may be configured to estimate the correction of the initial value of the time gap $T_{g1'}$ based on the upstream sync symbols within the R-P-VECTOR 1 signal. For example, the FTU-O may correlate the received upstream sync symbols with a locally generated sync symbol, find the time or sample differences between the peak correlation locations and the expected locations, and use the average of the sample differences as the correction. In one embodiment, the FTU-O may not perform upstream FEXT channel estimation before updating the initial value of time gap $T_{g1'}$. The FTU-O may transmit the updated value of time gap $T_{g1'}$ to the FTU-R in the O-TG-UPDATE message 424. The FTU-O may transmit the O-TG-UPDATE message 424 in automatic repeat (AR) mode. Once the FTU-R receives the O-TG-UPDATE message 424, the FTU-R may adjust upstream symbol alignment using the updated value of the time gap $T_{g1'}$ received in the O-TG-UPDATE message 424.

Once the upstream symbol alignment becomes sufficiently accurate (e.g. after the FTU-R receives the update value of the time gap $T_{g1'}$ in O-TG-UPDATE message 424), the active lines may estimate upstream crosstalk channels from the joining lines, and the joining lines may estimate the direct channel and crosstalk channels from both the active lines and other joining lines. A CE (e.g. VCE) within a DPU may compute the upstream post-coder coefficients for active lines and for joining lines in order to cancel crosstalk between active lines and joining lines. The FTU-O may signal completion of the O-CHANNEL DISCOVERY 1 stage 416 by sending to the FTU-R an O-P-SYNCHRO signal within O-SYNCHRO 1 stage 426.

After completion of the O-CHANNEL DISCOVERY 1 stage 416, joining lines may transmit signals within upstream data symbol positions without significantly disturbing transmission over active lines, and crosstalk from active lines into joining lines may be cancelled in the upstream direction. The Channel Discovery Phase 400 may then continue the initialization procedure for the initializing line. For instance, the FTU-R may proceed to an R-CHANNEL DISCOVERY 2 stage and transmit the R-IDLE and the R-MSG 1 message upstream. At this point, the upstream signals transmitted within the R-CHANNEL DISCOVERY 2 stage may comprise data symbols located in the data symbol positions. The value of time gap $T_{g1'}$ may also be further updated in the late stage of the Channel Discovery Phase by using an O-UPDATE message. After updating the value of time gap $T_{g1'}$ using the O-UPDATE message, the FTU-R may use the value of time gap $T_{g1'}$ to align the upstream sync symbols of the initializing lines with the upstream sync symbols of the active lines. The upstream FEXT channel may then be re-estimated for possible changes in FEXT channels based on the new alignment of upstream sync symbols.

Figure 5:
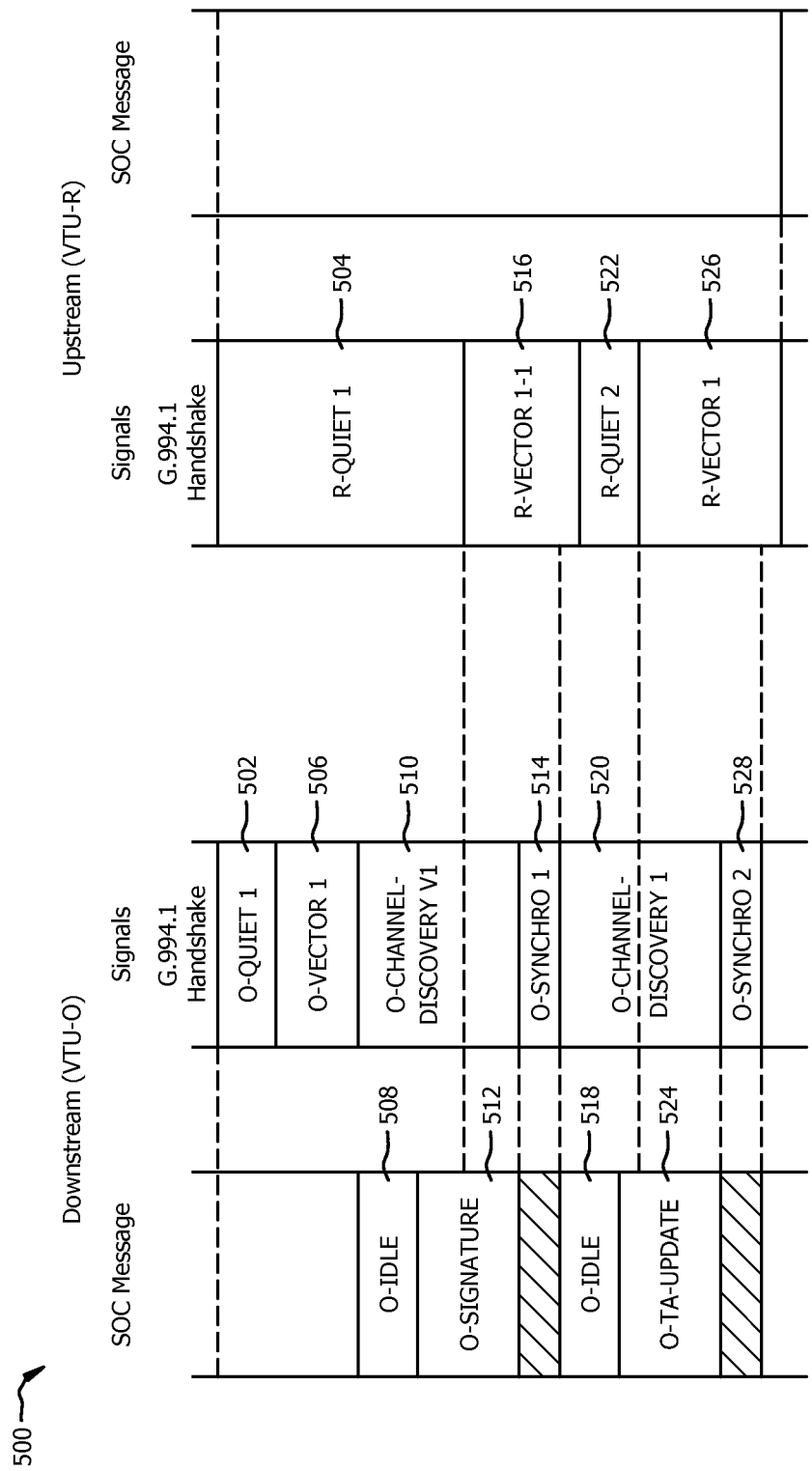
FIG. 5 is a time line diagram of an embodiment of an early stage of the Channel Discovery Phase for a VDSL(2) system.

FIG. 5 is a time line diagram of an embodiment of an early stage of the Channel Discovery Phase 500 for a VDSL(2) system. In contrast to a G.fast DSL system, the initialization procedure for one or more initializing lines may further comprise a Training Phase, in addition to the ITU-T G.994.1 Handshake Phase, Channel Discovery Phase, and Channel Analyze and Exchange Phase. After the Channel Discovery Phase, a VDSL2 system may enter the Training Phase to further train the modems and re-estimate FEXT channels from the initializing lines into active lines. The ITU-T G.994.1 Handshake Phase, Training Phase, and Channel Analyze and Exchange Phase are described in more detail in ITU-T G.993.5. Although the early stage of the Channel Discovery Phase 500 may be implemented within a VDSL2 system, the details discussed below for the early stage of the Channel Discovery Phase 500 may also be applicable to other xDSL systems, such as G.fast DSL system.

As shown in FIG. 5, the VTU-O starts out at the O-QUIET 1 stage 502 and the VTU-R starts out at the R-QUIET 1 stage 504 at the beginning of the early stage of the Channel Discovery Phase 500. During the O-QUIET 1 stage 502 and R-QUIET 1 stage 504, both the VTU-O and the VTU-R may not transmit data signals (e.g. output voltage is about zero). The VTU-O may then proceed to the O-VECTOR 1 stage 506, where the CE (e.g. VCE) is used to estimate FEXT channels from the initializing lines to the vectored lines. Afterwards, the VTU-O may enter the O-CHANNEL DISCOVERY V1 stage 510 to transmit the O-SIGNATURE messages 512 to VTU-R.

The O-SIGNATURE message 512 may comprise the initial timing advance that defines the upstream symbol offset. The VTU-O may assign the initial timing advance as a function of loop length. For example, the initial timing advance value may be calculated by the FTU-O using the expected longest loop serviced by a vectored group. The initial timing advance value may be implied by other information within the O-SIGNATURE message 512 or the initial timing advance value may be explicitly conveyed in the message. An initial timing advance value may be explicitly represented in the O-SIGNATURE message 512 using one of the fields to signify the expected time offset between the downstream symbols and upstream symbols at the VTU-O's U-O interface. In one embodiment, the initial timing advance value may be encoded within a 16-bit field using two's complement format.

After the VTU-R receives and decodes the O-SIGNATURE message 512, the VTU-R transitions to the R-VECTOR 1-1 stage 516 to transmit R-P-VECTOR 1-1 signals that comprise upstream sync symbols modulated by a pilot sequence. The VTU-R may transmit the R-P-VECTOR 1-1 signals such that the VTU-O may calculate an accurate timing advance correction. At this point, the VTU-O may not use the upstream sync symbols within the R-P-VECTOR 1-1 signals to perform upstream vectoring because the VTU-O may not have determined an accurate timing advance. The active lines data transmission may not be substantially affected by the transmission of the upstream sync symbols. The VTU-R may transmit the upstream sync symbols based on the initial timing advance value derived from the O-SIGNATURE message 512. With limited information from the early stage of the initialization, adjustments or corrections may need to be applied to the initial timing advance value.

For the VTU-O to accurately estimate the upstream symbol alignment transmitted during the R-VECTOR 1-1 stage 516 under a FEXT environment, the upstream sync symbols within the R-P-VECTOR 1-1 signals may be selected to be unique identifiable signals for each initialization line. In other words, the upstream sync symbols may have a relatively small correlation between different initialization lines. One such example is to add a constellation scrambler after the constellation encoder, and the constellation scrambler may use different pseudo-random binary sequence (PRBS) generators for different initialization lines or the same PRBS generator but different seed values for different initialization lines.

Afterwards, the VTU-R receives an O-P-SYNCHRO signal from the VTU-O within the O-SYNCHRO 1 stage 514, the VTU-R may stop sending upstream sync symbols within the R-P-VECTOR 1-1 signals and enter the R-QUIET 2 stage 522. The VTU-R may not perform any transmission during the R-QUIET 2 stage 522. After the O-SYNCHRO 1 stage 514, the VTU-O enters the O-CHANNEL DISCOVERY 1 stage 520. The VTU-O initially transmits the O-IDLE message 518 while calculating an updated timing advance value. Once VTU-O determines an updated timing advance value, the VTU-O may stop transmitting the O-IDLE message 518 and communicate to the VTU-R the timing advance correction value in an O-TA-UPDATE message 524. The O-TA-UPDATE message 524 may be sent in the same way as the O-SIGNATURE message 512 via the SOC channel.

Upon detecting the O-TA-UPDATE message 524, the VTU-R may start the R-VECTOR 1 stage 526 and begin transmitting the R-P-VECTOR 1 signal that comprises upstream sync symbols modulated by a pilot sequence using the timing advance corrected value based on the received instruction in the O-TA-UPDATE message 524. The upstream sync symbols may be aligned with the sync symbols of the vectored lines. During transmission within R-P-VECTOR 1 stage 526, the CE (e.g. VCE) may estimate the FEXT channels from the initializing line into all vectored lines and vice versa in order for the VTU-Os of the vectored lines to cancel FEXT from the initializing line. The FEXT from vectored lines to the initializing line could also be cancelled during the R-VECTOR 1 stage 526.

To end the O-CHANNEL DISCOVERY 1 stage 520, the VTU-O may transmit an O-P-SYNCHRO signal within the O-SYNCHRO 2 stage 528. The VTU-R may end the R-VECTOR 1 stage 526 after receiving the O-P-SYNCHRO signal. After the R-VECTOR 1 stage 526, a VTU-R may start signal transmission on the data symbol positions over the initializing line and the initialization procedure can be continued as described in ITU-T G.993.5. For instance, the VTU-R may subsequently transmit an R-IDLE message and an R-MSG 1 message via an SOC Channel within an R-CHANNEL DISCOVERY 1 stage. Both the R-IDLE and the R-MSG 1 messages may comprise data signals on the data symbol positions. The timing advance value may also be re-adjusted or updated in the late stage of the Channel Discovery Phase with the O-UPDATE message. Additionally, the timing advance value may be changed again in the O-TA_UPDATE message during the Training Phase.

Figures 6, 7:
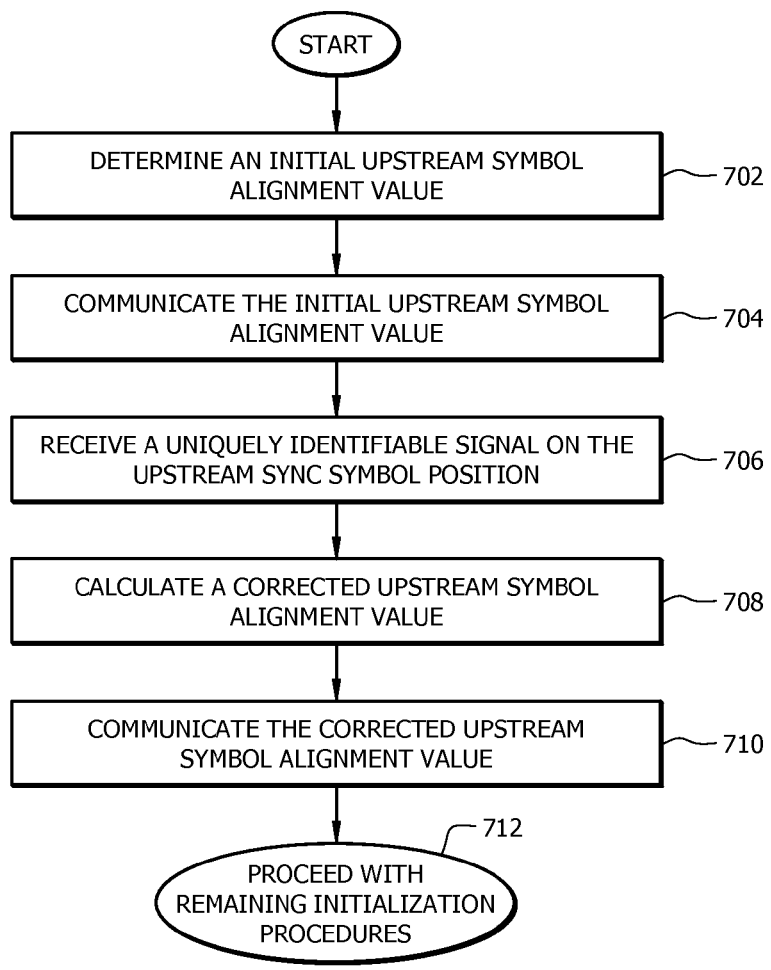
FIG. 6 is a schematic diagram of an embodiment of an O-TG-UPDATE message used during both initialization and showtime state for a subscriber line.
FIG. 7 illustrates a flowchart of an embodiment of a method for determining a corrected upstream symbol alignment value for an initializing line.

FIG. 6 is a schematic diagram of an embodiment of an O-TG-UPDATE message 600 used during initialization for a subscriber line. The O-TG-UPDATE message 600 may comprise a message descriptor field 602 and a time gap correction ($\Delta T_{g1'}$) field 604. The message descriptor field 602 may comprise a message code that identifies the type of message. In one embodiment, the O-TG-UPDATE message 600 may be about one byte long with a value of one. The time gap correction ($\Delta T_{g1'}$) field 604 may provide a correction value that represents the correction of the previously determined time gap $T_{g1'}$ (e.g. initial time gap $T_{g1'}$ value) relative to the current time gap $T_{g1'}$ expressed in samples (e.g. the delta value of $T_{g1'}$). The time gap correction ($\Delta T_{g1'}$) field 604 may be about 16 bits long and may be encoded in two's complement format. In another embodiment, the correction value within the time gap correction ($\Delta T_{g1'}$) field 604 may represent that value of the current time gap $T_{g1'}$ expressed in samples. The O-TA-UPDATE message 524 discussed in FIG. 5 may have a similar structure to the O-TG-UPDATE message 600, except that instead of a time gap correction ($\Delta T_{g1'}$) field 604, the O-TA-UPDATE message 524 may comprise a timing advance correction field. The timing advance correction field may be substantially similar to the time gap correction ($\Delta T_{g1'}$) field 604 except that the correction value within the field refers to the timing advance in FDD transmission instead of a time gap in TDD transmission.

FIG. 7 illustrates a flowchart of an embodiment of a method 700 for determining an upstream symbol alignment value for an initializing line. Method 700 may be implemented during the Channel Discovery Phase and prior to transmitting training signals within the data symbol positions. Method 700 may be implemented within a DPU, access node, a DSLAM, and/or any other network device on the operator side that comprises one or more xTU-Os. Transmission and receiving of data signals in the downstream direction may occur at the xTU-Os. Method 700 may start at block 702 and determine an initial upstream symbol alignment value. The initial upstream symbol alignment value may correspond to time gap $T_{g1'}$ discussed in FIG. 4 and/or the timing advance discussed in FIG. 5. Recall that the initial upstream symbol alignment value may be a function of a loop length.

Method 700 may then proceed to block 704 and communicate the initial upstream symbol alignment value. Method 700 may communicate the initial upstream symbol alignment value by transmitting an O-SIGNATURE message as discussed in FIGS. 4 and 5. Method 700 may then continue to block 706 and receive a uniquely identifiable signal on the upstream sync symbol position. In one embodiment, the uniquely identifiable signal may be the sync symbol within an R-P-VECTOR 1 signal as described in FIG. 4. Another embodiment of the uniquely identifiable signal may be the sync symbol within an R-P-VECTOR 1-1 signal as described in FIG. 5. Other embodiments of a uniquely identifiable signal may be any other DSL signal that comprises sync symbols with no signals located within the data symbol positions.

Method 700 may then move to block 708 and calculate a corrected upstream symbol alignment value based on the sync symbol received in the uniquely identifiable signal. The current upstream symbol alignment value may be determined based on the received uniquely identifiable signal. The corrected upstream symbol alignment value may be the difference between the initial upstream symbol alignment value and the current upstream symbol alignment value. In another embodiment, the corrected upstream symbol alignment value may be the actual value of the current upstream symbol alignment value. In other words, the corrected upstream symbol alignment value may correspond to the value found within the time gap correction ($\Delta T_{g1'}$) field 604 (e.g. $\Delta T_{g1'}$) as discussed in FIG. 6. After determining the corrected upstream symbol alignment value, method 700 may move to block 710. At block 710, method 700 may communicate the corrected upstream symbol alignment value. Method 700 may communicate the correction value for the upstream symbol alignment value in an O-TG-UPDATE message 424 described in FIG. 4 and an O-TA-UPDATE message 524 described in FIG. 5. Afterwards, method 700 moves to block 712 and proceeds with the remaining initialization procedures for an initializing line.

Figure 8:
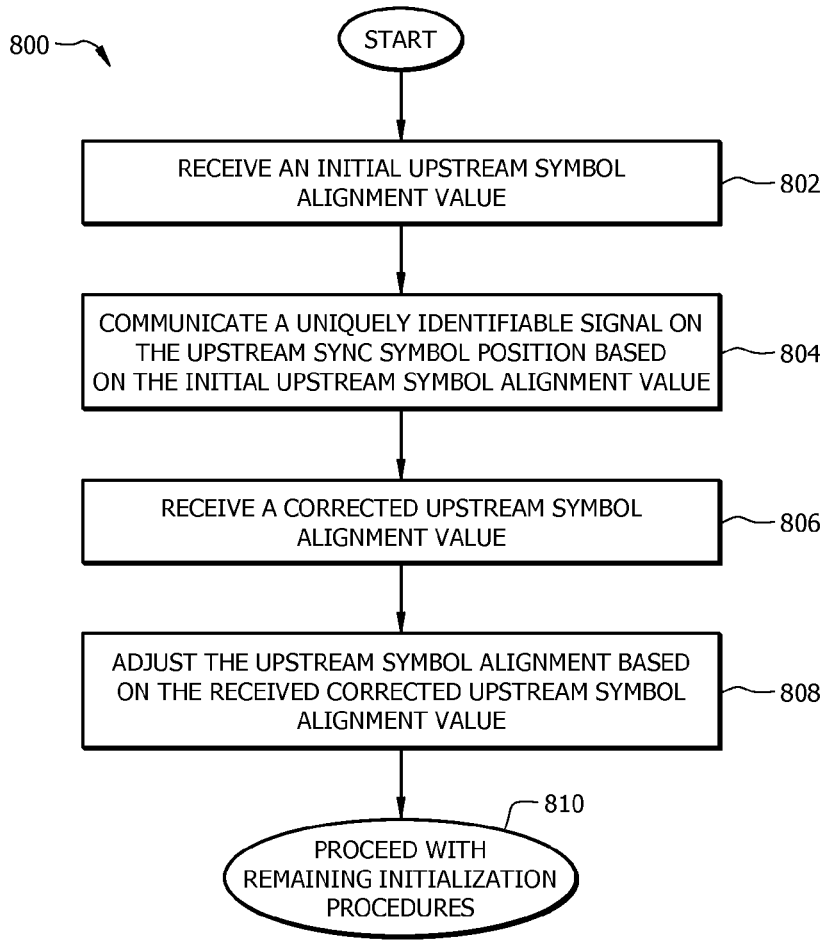
FIG. 8 illustrates a flowchart of another embodiment of a method for determining a corrected upstream symbol alignment value for an initializing line.

FIG. 8 illustrates a flowchart of another embodiment of a method 800 for determining an upstream symbol alignment value for an initializing line. Method 800 may be implemented during the Channel Discovery Phase and prior to transmitting training signals using the data symbol positions. Method 800 may be implemented within a CPE and/or any other network device on the remote side that comprises one or more xTU-Rs. Transmission and receiving of data signals in the upstream and downstream direction, respectively, may occur at the xTU-Rs. Method 800 may start at block 802 and receive an initial upstream symbol alignment value from the operator side. In one embodiment, method 800 may receive the initial upstream symbol alignment value within an O-SIGNATURE message as discussed in FIGS. 4 and 5. The upstream symbol alignment value may be time gap $T_{g1'}$ discussed in FIG. 4 or the timing advance discussed in FIG. 5.

Method 800 may then continue to block 804 and communicate a uniquely identifiable signal located on the upstream sync symbol position based on the received initial upstream symbol alignment value. In one embodiment, the uniquely identifiable signal may be the sync symbols within an R-P-VECTOR 1 signal as described in FIG. 4. Another embodiment of the uniquely identifiable signal may be the sync symbol within an R-P-VECTOR 1-1 signal as described in FIG. 5. Other embodiments of the uniquely identifiable signal may be any other DSL signal that comprises sync symbols with no signals located within the data symbol positions. For example, the uniquely identifiable signal may consist of only sync symbols.

Method 800 may then move to block 806 and receive a corrected upstream symbol alignment value (e.g. $\Delta T_{g1'}$). The corrected upstream symbol alignment value may be received in an O-TG-UPDATE message 424 described in FIG. 4 or an O-TA-UPDATE message 524 described in FIG. 5. After receiving the correction value for the upstream symbol alignment value, method 800 may then move to block 808 and adjust the upstream symbol alignment based on the received corrected upstream symbol alignment value. Afterwards, method 800 moves to block 810 and proceeds with the remaining initialization procedures for an initializing line, such as transmitting R-IDLE and R-MSG1 messages.

Figure 9:
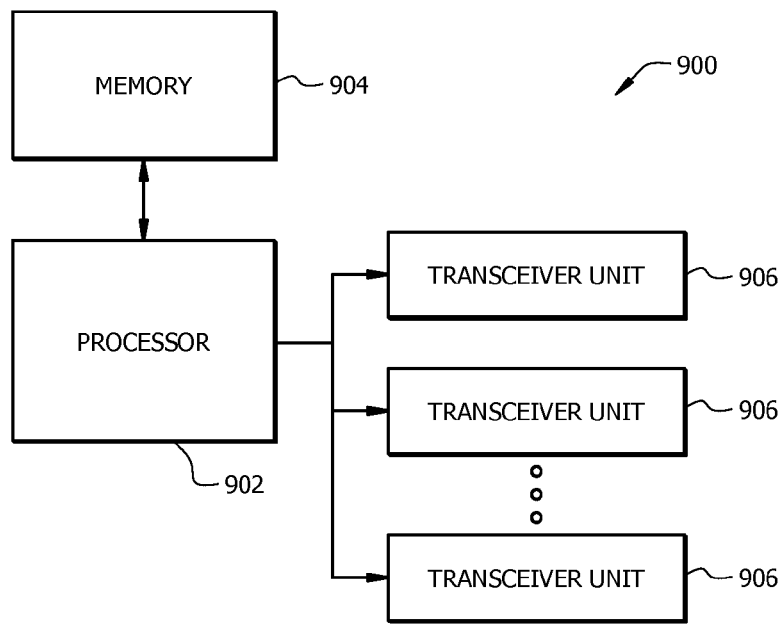
FIG. 9 is a schematic diagram of an embodiment of a network element.

At least some of the features/methods described in the disclosure may be implemented in a network element. For instance, the features/methods of the disclosure may be implemented using hardware, firmware, and/or software installed to run on hardware. FIG. 9 is a schematic diagram of an embodiment of a network element 900 that may be capable of receiving and transmitting DSL messages, such as user data packets that comprise data symbols in FDD and/or TDD transmission, and state transition requests to and from a network, such as an xDSL system. The network element 900 may be any apparatus and/or network node configured to perform upstream symbol alignment. For example, network element 900 may be a DPU, access node, or CPE within an xDSL system. The terms network "element," "node," "component," "module," and/or similar terms may be interchangeably used to generally describe a network device and do not have a particular or special meaning unless otherwise specifically stated and/or claimed within the disclosure.

The network element 900 may comprise one or more transceiver units 906 (e.g. FTU-O and/or FTU-R), which may be transmitters, receivers, or combinations thereof. The transceiver units 906 may transmit and/or receive frames from other network nodes. A processor 902 may be coupled to the transceiver units 906 and may be configured to process the frames and/or determine which nodes to send (e.g. transmit) the frames. In one embodiment, the processor 902 may comprise one or more multi-core processors and/or memory modules 904, which may function as data stores, buffers, etc. The processor 902 may be implemented as a general processor or may be part of one or more application specific integrated circuits (ASICs) and/or digital signal processors (DSPs). Although illustrated as a single processor, the processor 902 is not so limited and may comprise multiple processors. The processor 902 may be configured to implement any of the schemes described herein, including methods 700 and 800.

FIG. 9 illustrates that the memory module 904 may be coupled to the processor 902 and may be a non-transitory medium configured to store various types of data. Memory module 904 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 904 may be used to house the instructions for carrying out the system and methods described herein, e.g. method 700 implemented at DPU. In one example embodiment, the memory module 904 may comprise an upstream symbol alignment at the operator side module that may be implemented on the processor 902. Alternately, the upstream symbol alignment at the operator side module may be implemented directly on the processor 902. The upstream symbol alignment at the operator side module may be configured to determine and calculate the initial value of the time gap $T_{g1'}$, update the initial value of the time gap $T_{g1'}$ as described in FIGS. 4, 5, and 7, cancel crosstalk (e.g. FEXT), and/or other functions used for upstream symbol alignment and cancel crosstalk for an initializing line. In another embodiment, the memory module 904 may comprise an upstream symbol alignment at the remote side module used to adjust the upstream symbol alignment based on the initial value of the time gap $T_{g1'}$ and the updated value of the time gap $T_{g1'}$, and/or other functions that pertain to upstream symbol alignment. Using FIG. 1 as an example, the CPE 122 may comprise the upstream symbol alignment at the remote side module. Examples of functions performed by the upstream symbol alignment at the remote side module are disclosed above in FIGS. 4, 5, and 8.

It is understood that, by programming and/or loading executable instructions onto the network element 900, at least one of the processor 902 and the memory module 904 can be changed. As a result, the network element 900 may be transformed in part into a particular machine or apparatus (e.g. a DPU having the functionality taught by the present disclosure). The executable instructions may be stored on the memory module 904 and loaded into the processor 902 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network system comprising:
 a G.fast transceiver unit at an operator side (FTU-O), wherein the FTU-O is configured to perform the following during a CHANNEL DISCOVERY 1 stage for a joining line:
  send to a G.fast transceiver unit at remote side (FTU-R) an initial value of a time gap $T_{g1'}$ within an O-SIGNATURE message;
  receive an R-P-VECTOR 1 signal;
  estimate a correction of the initial value of the time gap $T_{g1'}$; and
  transmit the correction of the initial value of the time gap $T_{g1'}$ to the FTU-R using an O-TG-UPDATE message,
  wherein the time gap $T_{g1'}$ is an upstream time gap located between an end of receiving a downstream transmission and a start of transmitting an upstream transmission by the FTU-R;
 the network system further comprising a vectoring control entity (VCE) configured to:
  compute a plurality of upstream post-coder coefficients for one or more active lines and the joining line after the transmission of the O-TG-UPDATE message; and
  cancel an upstream far-end crosstalk (FEXT) for the active lines and the joining line after the transmission of the O-TG-UPDATE message,
  wherein estimating and cancelling the upstream FEXT is not used by the FTU-O when estimating the correction of the initial value of the time gap $T_{g1'}$.

2. The network system of claim 1, further comprising the FTU-R, wherein the FTU-R is configured to:
 detect the O-SIGNATURE message to transition to an R-VECTOR 1 stage;
 transmit the R-P-VECTOR 1 signal using the initial value of the time gap $T_{g1'}$ within the O-SIGNATURE message;
 detect the O-TG-UPDATE message that comprises a correction value of the time gap $T_{g1'}$;
 adjust the time gap $T_{g1'}$ with the correction value of the time gap $T_{g1'}$ indicated by the O-TG-UPDATE message; and transmit a subsequent R-P-VECTOR 1 signal with the time gap $T_{g1'}$ as adjusted.

3. The network system of claim 1, wherein the FTU-O is further configured to perform the following during a CHANNEL DISCOVERY 1 stage for an initializing line:
stop transmitting an O-SIGNATURE signal after detecting the R-P-VECTOR 1 signal; and
estimate the correction of the initial value of the time gap $T_{g1'}$ based on the R-P-VECTOR 1 signal,
wherein the downstream a transmission and the upstream transmission are located within a Time-Division Duplex (TDD) frame.

\* \* \* \* \*